US00RE47308E

(19) United States
(12) Reissued Patent
Fujimoto

(10) Patent Number: US RE47,308 E
(45) Date of Reissued Patent: Mar. 19, 2019

(54) MEMORY DEVICE, HOST DEVICE, MEMORY SYSTEM, MEMORY DEVICE CONTROL METHOD, HOST DEVICE CONTROL METHOD AND MEMORY SYSTEM CONTROL METHOD

(71) Applicant: TOSHIBA MEMORY CORPORATION, Minato-ku (JP)

(72) Inventor: Akihisa Fujimoto, Kanagawa (JP)

(73) Assignee: TOSHIBA MEMORY CORPORATION, Minato-ku (JP)

(21) Appl. No.: 15/463,738

(22) Filed: Mar. 20, 2017

Related U.S. Patent Documents

Reissue of:
(64) Patent No.: 9,383,792
Issued: Jul. 5, 2016
Appl. No.: 14/312,543
Filed: Jun. 23, 2014

U.S. Applications:
(63) Continuation of application No. 13/667,285, filed on Nov. 2, 2012, now Pat. No. 8,799,679, which is a (Continued)

(30) Foreign Application Priority Data

Mar. 19, 2008 (JP) ..... 2008-072429
Apr. 7, 2008 (JP) ..... 2008-099740

(51) Int. Cl.
*G06F 1/26* (2006.01)
*G06K 19/07* (2006.01)

(52) U.S. Cl.
CPC ..... *G06F 1/266* (2013.01); *G06K 19/07* (2013.01)

(58) Field of Classification Search
CPC ..... G06F 1/26; G06F 1/3203; G06F 1/3296; G06F 1/3234; G06F 1/3287;
(Continued)

(56) References Cited

U.S. PATENT DOCUMENTS 5,490,117 A 2/1996 Oda et al.
5,828,892 A 10/1998 Mizuta
(Continued)

FOREIGN PATENT DOCUMENTS

CN 101060007 10/2010
EP 1551031 7/2005
(Continued)

OTHER PUBLICATIONS

Office Action dated Jan. 19, 2012 in Korean Application No. 10-2010-7020950.
(Continued)

*Primary Examiner* — Minh Dieu Nguyen
(74) *Attorney, Agent, or Firm* — Oblon, McClelland, Maier & Neustadt, L.L.P.

(57) ABSTRACT

A memory card 100 having a NAND type flash memory connectable to a host device 200, capable of transmitting/receiving a signal to/from the host device 200 at a first voltage (3.3 V) or a second voltage (1.8 V) and safely changing a signal voltage of a transmission/reception signal that mutually checks a signal voltage through handshake processing with the host device 200 when the signal voltage is switched.

31 Claims, 13 Drawing Sheets

Related U.S. Application Data continuation of application No. 12/933,586, filed as application No. PCT/JP2008/066618 on Sep. 9, 2008, now Pat. No. 8,321,697.

(58) Field of Classification Search

CPC ... G06K 15/4055; H04W 52/00; Y02D 10/10; Y02D 10/171

USPC ..... 713/300, 310, 324; 365/226; 235/441, 235/492

See application file for complete search history.

(56) References Cited

U.S. PATENT DOCUMENTS

| | | | | |
|---|---|---|---|---|
| 7,353,993 | B2 | 4/2008 | Fujimoto | |
| 8,321,697 | B2 * | 11/2012 | Fujimoto | 713/300 |
| 8,799,689 | B2 * | 8/2014 | Fujimoto | 713/300 |
| 2007/0055308 | A1 | 3/2007 | Haller et al. | |
| 2007/0079149 | A1 | 4/2007 | Sahu et al. | |
| 2009/0077393 | A1 * | 3/2009 | Nakamura | G06F 1/26 713/310 |

FOREIGN PATENT DOCUMENTS

| | | | |
|---|---|---|---|
| JP | 9 231339 | | 9/1997 |
| JP | 2001-134356 | | 5/2001 |
| JP | 2001-256174 | | 9/2001 |
| JP | 2001-282397 | | 10/2001 |
| JP | 6 333103 | | 12/2004 |
| JP | 2007-011788 | | 1/2007 |
| JP | 2009-176136 | | 8/2007 |
| JP | 2001-256174 | | 9/2011 |
| KR | 2003-0072434 | | 9/2003 |
| TW | 200638271 | | 11/2006 |
| TW | 200639873 | | 11/2006 |
| WO | 2005/066745 | A1 | 7/2005 |
| WO | 2006 057049 | | 6/2006 |
| WO | 2007/127678 | A2 | 11/2007 |

OTHER PUBLICATIONS

Office Action issued Jan. 19, 2012 in Korean Application No. 10-2010-7020950.

Office Action issued Feb. 28, 2012, in Japanese Patent Application 10-2008-099740.

* cited by examiner

FIG.7A (A) Command Parameter of Switch Command (24bit)

| | | | | | |
|---|---|---|---|---|---|
| Other Parameter | Other Parameter | Other Parameter | Other Parameter | Other Parameter | Bus Accesses Mode/Bus Voltage Mode |

Bus Access Mode

0 ··· Normal Speed Mode(NSM)
1 ··· High Speed Mode(HSM)
3 ··· Ultra High Speed Mode(UHSM)

FIG.7B (B) Status resistor data for Switch Command (512bit)

| Other Parameter | | | | | |
|---|---|---|---|---|---|
| Other Parameter | Other Parameter | Other Parameter | Other Parameter | Other Parameter | Bus Accesses Mode/Bus Voltage Mode |
| Other Parameter | | | | | |

Bus Access Mode

0 ··· Normal Speed Mode(NSM)
1 ··· High Speed Mode(HSM)
3 ··· Ultra High Speed Mode(UHSM)
0xF ··· Enable

MEMORY DEVICE, HOST DEVICE, MEMORY SYSTEM, MEMORY DEVICE CONTROL METHOD, HOST DEVICE CONTROL METHOD AND MEMORY SYSTEM CONTROL METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation of and claims the benefit of priority under 35 U.S.C. § 120 from U.S. Ser. No. 13/667,285, filed Nov. 2, 2012, which is a continuation of U.S. Ser. No. 12/933,586, filed Sep. 20, 2010, now U.S. Pat. No. 8,321,697, which is a National Stage of PCT/JP2008/066618, filed on Sep. 9, 2008, and claims the benefit of priority from JP 2008-072429 filed Mar. 19, 2008 and JP 2008-099740 filed Apr. 7, 2008, the entire contents of each of which are incorporated herein by reference.

TECHNICAL FIELD

The present invention relates to a memory device including a semiconductor memory section, a host device, a memory system, a memory device control method, a host device control method and a memory system control method, and more particularly, to a memory device or the like capable of changing a voltage of a data transfer signal.

BACKGROUND ART

In recent years, semiconductor storage devices, for example, flash memory cards, which are non-volatile semiconductor storage media, have been developed and are widely used as external storage devices for information devices such as a digital camera which is a host device. Accompanying an increasing volume of data handled by host devices, volume and density of flash memories are also being increased.

A NAND type flash memory is a flash memory featuring a large volume and widely used particularly for applications such as file memories in recent years.

The NAND type flash memory uses electric charge injected into a trap layer made up of a floating gate or multi-layered film via a tunnel insulating film, in other words, a charge accumulated layer as digital bit information according to the amount of electric charge and reads the digital bit information as two-valued or multi-valued information. Unlike destructive reading type memory such as DRAM, the NAND type flash memory can read data without corrupting data.

Semiconductor storage devices are required to realize higher-speed writing and reading and also required to increase the bus transfer rate of a transfer bus. For this reason, for example, a high-speed mode specification with the transfer clock frequency of a memory card bus increased from 25 MHz in a normal mode to 50 MHz is defined allowing fast data transfers.

On the other hand, Japanese Patent Application Laid-Open Publication No. 2007-11788 discloses a memory card, for faster data transfer, that provides an ultra-high-speed mode capable of achieving a double data transfer rate at the same clock frequency as that of a high-speed mode by transmitting/receiving data in synchronization with the rising edge and falling edge of a clock signal supplied from a host device.

However, increasing the transfer clock frequency raises a problem of shielding unnecessary radiation electromagnetic wave, that is, taking remedial actions for EMI (Electro Magnetic Susceptibility). Furthermore, increasing the transfer clock frequency also results in a problem that power consumption of the memory card increases.

To solve these problems, it is effective to reduce signal voltages of transmission/reception signals between the memory card and a host device. However, when the signal voltage of a transmission/reception signal is changed, a voltage higher than expected is applied, increasing a possibility that an I/O cell of the memory card or host device may be destroyed.

DISCLOSURE OF INVENTION

Means for Solving the Problem

An embodiment of the present invention provides a memory device connectable to a host device including: a non-volatile memory section; a first I/O cell that can transmit and receive a command signal, a response signal, a clock signal or a data signal to/from the host device through a command signal line, a response signal line, a clock signal line or a data signal line respectively at any one signal voltage selected from a first voltage and a second voltage which is lower than the first voltage; a first regulator that can output the first voltage and the second voltage; and a memory controller that sends, upon receiving the command signal requesting the signal voltage to be switched from the first voltage to the second voltage from the host device, information indicating that the signal voltage will be switched to the host device using a response signal, switches the voltage outputted from the first regulator from the first voltage to the second voltage applies, upon detecting that a voltage other than a ground level is applied to the clock signal line after a lapse of a predetermined time, a second voltage to the response signal line and data signal line of the ground level and starts transmission/reception at the signal voltage of the second voltage.

BRIEF DESCRIPTION OF THE DRAWINGS

FIG. 7A is a diagram illustrating parameter examples of a switch command sent by the host device according to the embodiment;

FIG. 7B is a diagram illustrating parameter examples of a switch command sent by the host device according to the embodiment;

BEST MODE FOR CARRYING OUT THE INVENTION

First Embodiment

Hereinafter, a memory card 100 which is a memory device, a host device 200, and a memory system 1 provided with the memory card 100 and the host device 200 according to a first embodiment of the present invention will be explained with reference to the accompanying drawings.

Figure 1:
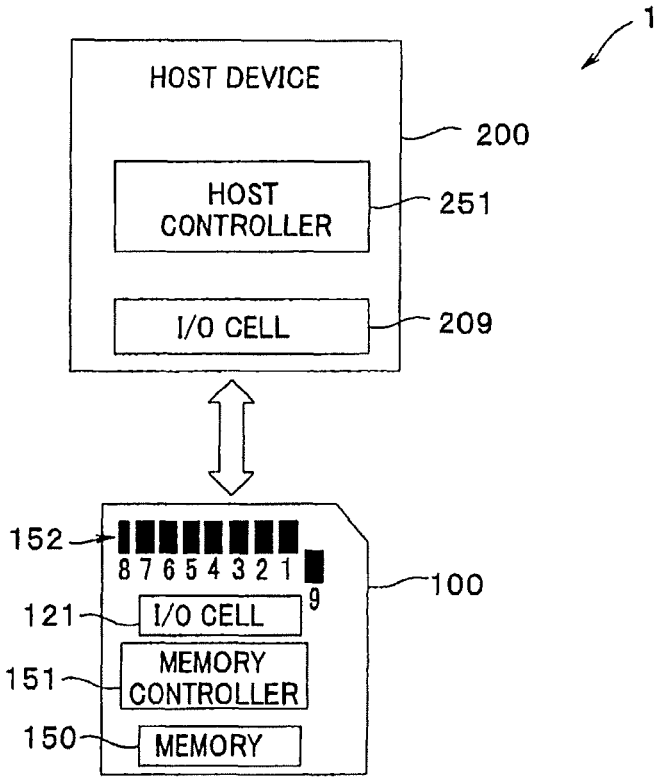
FIG. 1 is a schematic view showing a configuration of a memory system made up of a memory card and a host device according to an embodiment.
Figure 2:
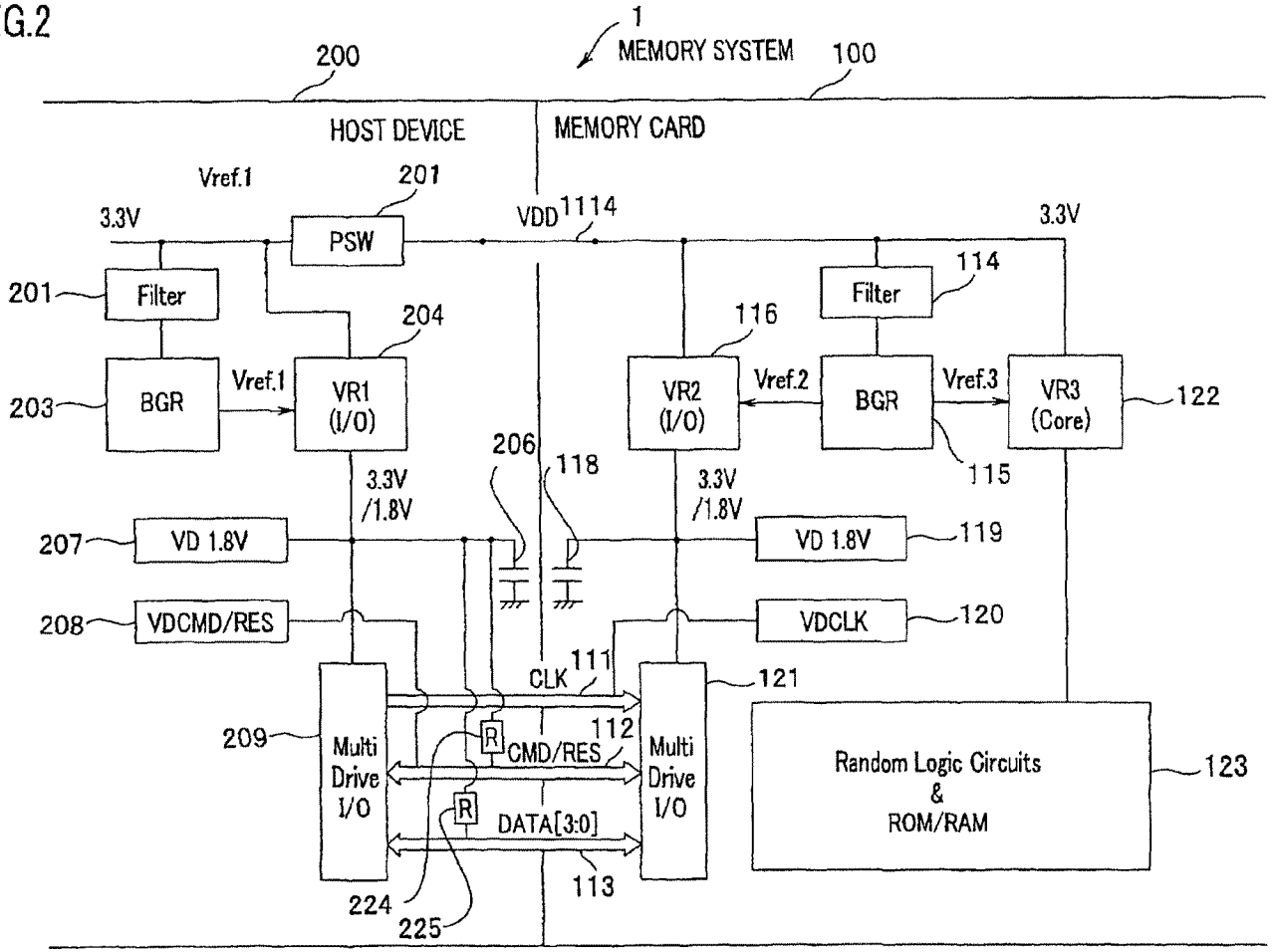
FIG. 2 is a block diagram showing a configuration of a power circuit part of the memory system according to the embodiment.

FIG. 1 is a schematic view showing a configuration of the memory system 1 made up of the memory card 100 and the host device 200 and FIG. 2 is a block diagram showing a configuration of a power circuit part of the memory system 1.

As shown in FIG. 1, the memory card 100 is connectable to the host device 200 and is an SD memory card (registered trademark) connected to the host device 200 and used as an external storage device of the host device 200. Examples of the host device 200 include an information processing apparatus including a personal computer that processes various kinds of data such as image data or music data, and a digital camera. The host device 200 includes an I/O cell 209 for transmitting/receiving a command signal, response signal, clock signal and data signal, that is, transmission signals to/from the memory card 100 connected and a host control section 251 that controls transmission/reception of a transmission signal or the like.

The memory card 100 is provided with a memory section 150 made up of a non-volatile memory, a memory controller 151 that controls the memory section 150 and transmission/reception or the like of a transmission signal, an I/O cell 121 for inputting/outputting data and a connector 152 (including pin 1 to pin 9). The memory controller 151 is connected to the memory section 150 via a bus of, for example, 8-bit bus width.

When the memory card 100 is attached to the host device 200, the connector 152 is electrically connected to the host device 200. Allocation of signal lines to the pin 1 to pin 9 included in the connector 152 is defined in the standard of an SD memory card (registered trademark).

That is, data DAT0, DAT1, DAT2 and DAT3 to transmit and receive a data signal are allocated to pin 7, pin 8, pin 9 and pin 1 respectively. Furthermore, the pin 1 is also allocated to a card detection signal CD. A command signal CMD and a response signal RES which is a response signal of the memory card 100 to this command signal are allocated to the pin 2. A clock signal CLK is allocated to the pin 5. A supply voltage VDD is allocated to the pin 4 and a grounding voltage VSS1 is allocated to the pin 3 and a grounding voltage VSS2 is allocated to the pin 6.

In the memory card 100 of the present embodiment, the memory section 150 is a non-volatile semiconductor memory and made up of a NAND type flash memory. Data or the like sent from the host device 200 is stored in the memory section 150.

Furthermore, as shown in FIG. 2, the bus that transmits/receives a signal or the like between the memory card 100 and host device 200 includes a CLK line 111 (hereinafter also referred to as a "clock signal line"), a CMD/RES line 112 (hereinafter also referred to as a "CMD line"), a DAT[3:0] line 113 and a VDD line (hereinafter also referred to as a "power line"), and a DAT1 line, a DAT2 line, a CD/DAT3 line, a VSS1 line and a VSS2 line which are not shown. Hereinafter, the DAT0 line (hereinafter also referred to as a "data line") will be explained as an example of the data signal line. Furthermore, the CMD/RES line is also referred to as a command signal line or response signal (RES) line. That is, the command signal line and the response signal line are one and the same signal line.

As the operation mode (hereinafter also referred to as a "transfer mode") of the memory card 100 which is the SD memory card (registered trademark) during a data transfer, an SD mode and an SPI mode are defined. Furthermore, as the transfer mode of the SD mode, two modes: a 1-bit mode using only the data DAT0 and a 4-bit mode using the data DAT0 to DAT3 are defined. As the transfer mode of the memory card 100, in addition to a normal speed mode (NSM) of a normal transfer rate and a high-speed mode (HSM) of a speed doubling that of the NSM, an ultra-high-speed mode (UHSM) of a speed further doubling that of the HSP is defined depending on the transfer clock frequency or the like.

As shown in FIG. 2, the memory card 100 of the memory system 1 has a regulator (VR2) 116, which is a first regulator, and the host device 200 of the memory system 1 has a regulator (VR1) 204 which is a second regulator. Therefore, in addition to a data transfer mode whose signal voltage is a standard 3.3 V (hereinafter referred to as a "3.3 V mode") which is a voltage mode supported by many memory systems 1, the memory system 1 supports a mode in which the supply voltage remains standard 3.3 V and the data transfer signal voltage is set to a lower voltage 1.8 V (hereinafter referred to as a "1.8 V mode").

That is, the memory card 100 has a multi-drive type first I/O cell 121 that can transmit and receive a command signal, response signal, clock signal and data signal to/from the host device 200 at any one signal voltage selected from a first voltage (3.3 V) and a second voltage (1.8 V), which is lower than the first voltage and the first regulator 116 that can output the first voltage and the second voltage, and the host device 200 has a multi-drive type second I/O cell 209 and the second regulator 204 of specifications similar to those of the memory card 100.

In FIG. 2, a power switch (PSW) 201 is a switch that turns ON/OFF the supply voltage (VDD) applied to the memory card 100. Band gap references (BGR) 115 and 203 are reference voltage generation circuits using a potential difference of a band gap. Noise filters (Filter) 114 and 201 are not indispensable parts, yet effective in preventing noise from the power line (VDD) and generating more stable reference voltages. The first regulator (VR2) 116 and the second regulator (VR1) 204 are regulators that create a 1.8 V voltage from a 3.3 V supply voltage and generate the 1.8 V voltage based on the reference voltages of the BGRs 115 and 203 respectively.

A third regulator (VR3) 122 which is a core voltage generation circuit, which is an internal logic circuit, generates a voltage supplied to a random logic section 123. The random logic section 123 is a circuit having the memory controller 151 shown in FIG. 1, ROM and RAM or the like. The host device 200 may also need a voltage generation circuit for the internal logic, which is however not shown. A comparator (VDCLK) 120, which is a first voltage comparison circuit, detects whether or not the voltage of the CLK line is 1.8 V. Furthermore, a comparator (VDCMD/RES) 208, which is a second voltage comparison circuit, detects whether or not the voltage of the CMD/RES line is 1.8 V. On the other hand, a comparator 119, which is a third voltage comparison circuit or a comparator 207, which is a fourth voltage comparison circuit, detects whether or not a 1.8 V voltage is correctly generated from the first regulator (VR2) 116 or the second regulator (VR1) 204 respectively.

Here, that the second voltage is 1.8 V means that the second voltage falls within a range of 1.65 V to 1.95 V. Furthermore, the comparator that detects whether a voltage is the first voltage or the second voltage is a voltage comparator having a third threshold voltage intermediate between the first voltage and the second voltage, decides on the first voltage when the voltage of the measurement line is higher than the third threshold voltage, and decides on the second voltage when the voltage of the measurement line is lower than the third threshold voltage.

When the signal of the bus line is a tri-state, pull-up resistors 224 and 225 keep the voltage of each line to 3.3 V or 1.8 V. Furthermore, capacitors 118 and 206 accumulate charge to stabilize a predetermined voltage.

Figure 3A:
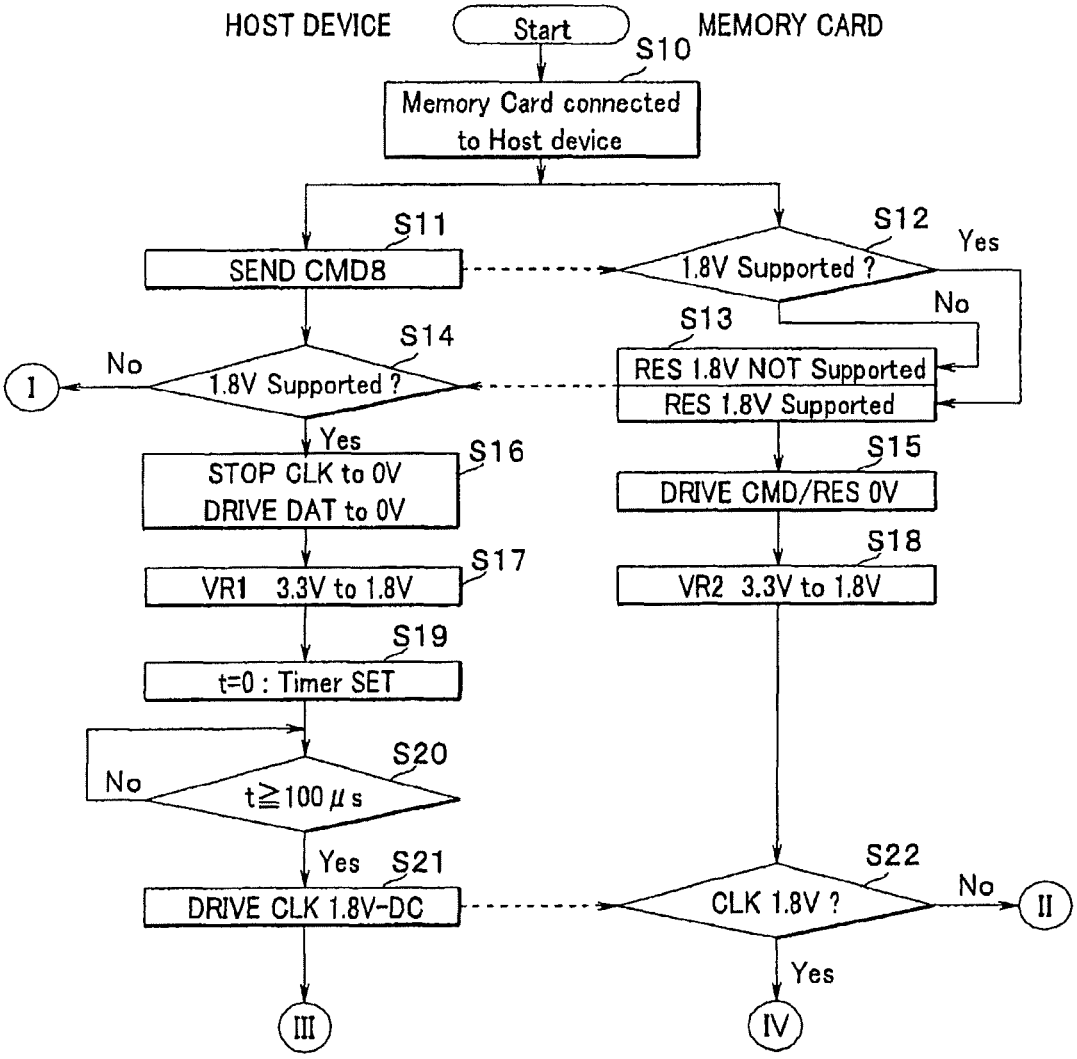
FIG. 3A is a flowchart illustrating a signal voltage switching operation in the memory system according to the embodiment.
Figure 3B:
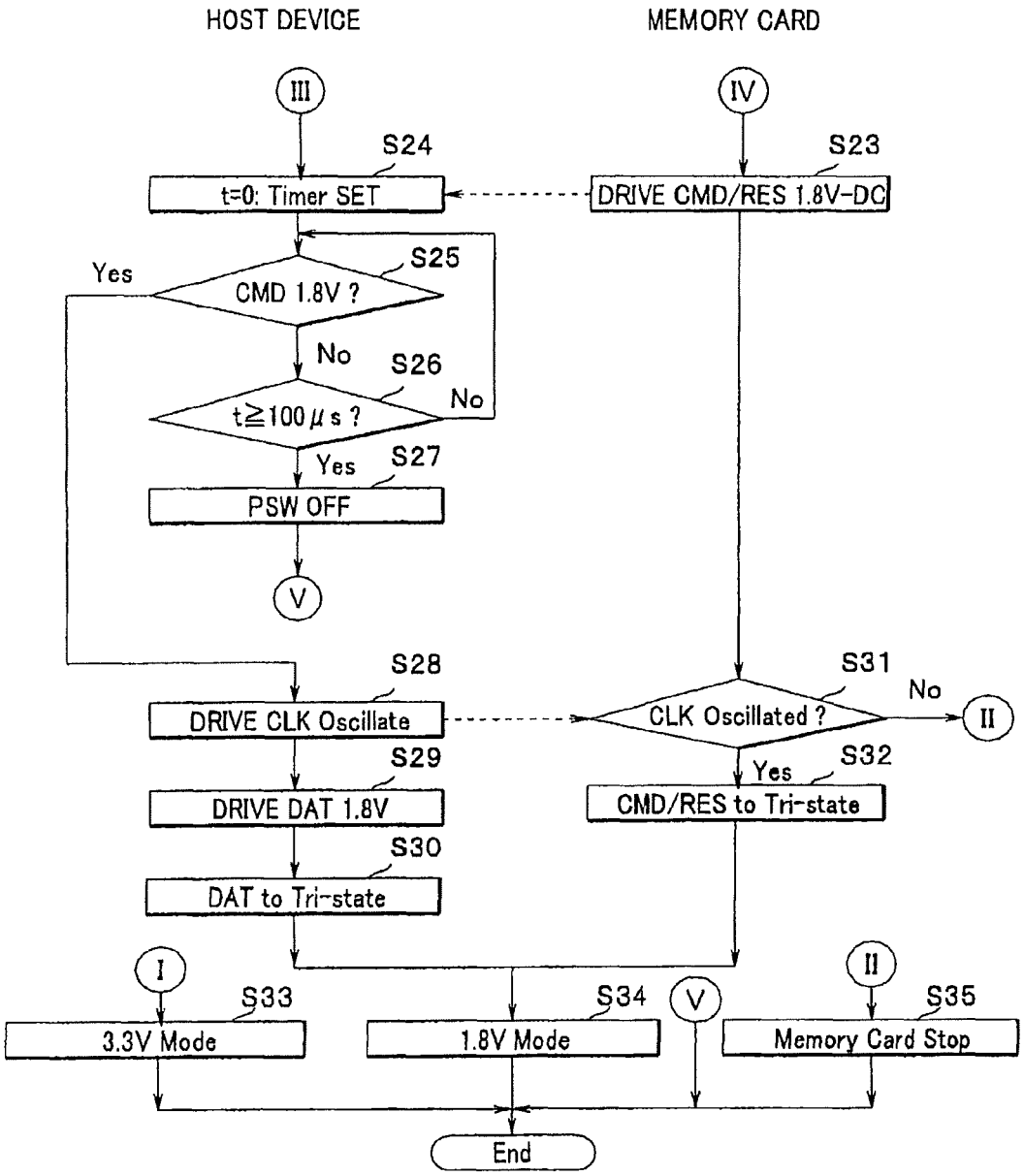
FIG. 3B is a flowchart illustrating the signal voltage switching operation in the memory system according to the embodiment.
Figure 4:
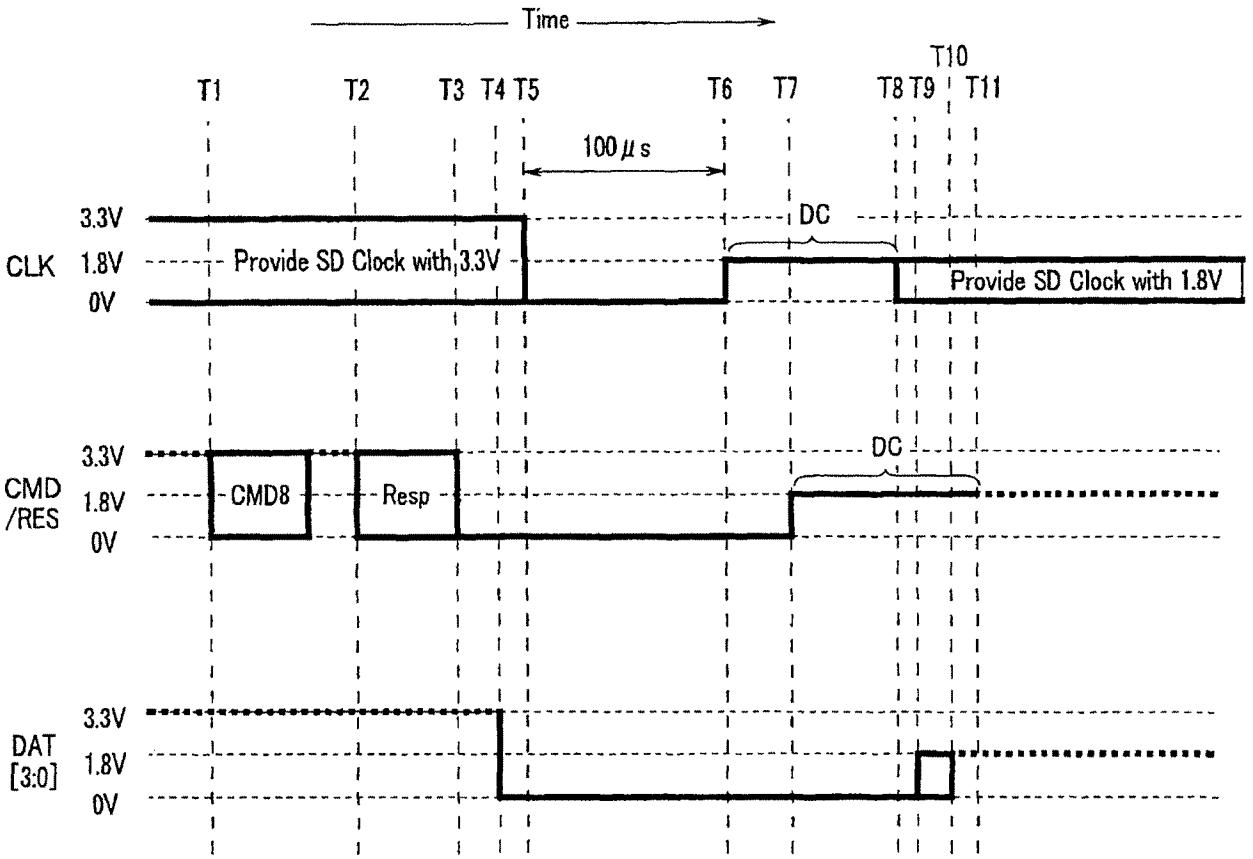
FIG. 4 is a bus timing chart during the signal voltage switching operation in the memory system according to the embodiment.

Next, a signal voltage switching operation of the memory system 1 will be explained using FIG. 3A, FIG. 3B and FIG. 4. FIG. 3A and FIG. 3B are flowcharts illustrating the signal voltage switching operation of the memory system 1 and FIG. 4 is a timing chart of a signal line group (bus) during the signal voltage switching operation of the memory system 1.

The host device 200 performs a signal voltage switching operation taking into consideration compatibility with the memory card supporting only the 3.3 V mode. That is, if the host device 200 applies a 1.8 V signal voltage to the connected memory card from the beginning, the input I/O cell of the memory card supporting only the 3.3 V mode recognizes the applied 1.8 V as an intermediate voltage. Therefore, a large through current may flow through the input I/O cell of the memory card.

Therefore, the host device 200 follows a procedure of sending a signal of 3.3 V signal voltage to the memory card first and switching to the 1.8 V mode only after detecting that the memory card is a memory card that supports the 1.8 V mode through handshake processing which will be described later.

Hereinafter, the signal voltage switching operation of the memory system 1 will be explained following the flowcharts in FIG. 3A and FIG. 3B. The left side of FIG. 3A and FIG. 3B shows the operation flow of the host device 200 and the right side shows the operation flow of the memory card 100.

<Step S10> Memory Card Connected to Host Device

The memory card 100 is connected to the host device 200. That is, with the lines 111 to 113 making up the bus interface, the I/O cell 121 of the memory card 100 and the I/O cell 209 of the host device 200 are connected through the command/response signal line, clock signal line and data signal line or the like.

<Step S11> CMD8

In the case of the host device 200 supporting a 1.8 V mode, the host device 200 inquires whether or not the connected memory card 100 supports the 1.8 V mode. That is, the host device 200 issues a command CMD8 first (FIG. 4: T1). Since a bit requesting the shift to the 1.8 V mode is set in an argument of the CMD8, the command signal CMD8 transmitted from this host device 200 to the memory card 100 is also a command signal that informs that the signal voltage will be changed from the first voltage (3.3 V) to the second voltage (1.8 V).

<Step S12> 1.8 V supported?

Upon receiving the command signal CMD8 from the host device, the memory card 100 decides whether or not the memory card 100 supports the 1.8 V mode.

<Step S13> RES 1.8 V Not Supported/RES 1.8 V Supported

When the memory card 100 does not support the 1.8 V mode (step S12: No), the memory card 100 sends in reply a response signal indicating that the 1.8 V mode is not supported to the host device 200.

On the other hand, when the memory card 100 supports the 1.8 V mode (step S12: Yes), the memory card 100 sends in reply a response signal indicating that the mode will be switched to the 1.8 V mode to the host device 200 (FIG. 4: T2).

<Step S14> 1.8 V Supported?

Upon receiving a response signal (No) indicating that the 1.8 V mode is not supported from the memory card 100, the host device 200 starts initialization processing in the 3.3 V mode in S33.

On the other hand, upon receiving a response signal (Yes) indicating that the 1.8 V mode is supported from the memory card 100, the host device 200 performs processing of mutually sending a next transmission signal based on the contents of the received signal, so-called handshake processing.

<Step S15> Drive CMD/RES to 0 V

After sending the response signal, the memory card 100 sets the CMD line to L level (ground level=0 V) (FIG. 4: T3).

<Step S16> Stop CLK to 0 V, Drive DAT to 0 V

The host device 200 sets the DAT line to L level (ground level: 0 V) (FIG. 4: T4), stops clock oscillation and also sets the CLK line to L level (ground level: 0 V) (FIG. 4: T5). Any line of the DAT line and CLK line can be driven to L level first.

Here, the reason that the CMD line, CLK line and DAT line are set, that is, driven to L level (0 V) is to prevent the respective lines from becoming a tri-state and prevent unstable voltages from being applied. When an unstable voltage is applied to the I/O cell 121 or the like for a voltage switching period, there is a danger that a through current may flow through the I/O cell 121 or the like. For this reason, the host device 200 or memory card 100 fixes the voltage of the signal line to L level (0 V).

<Step S17, step S18> VR1, VR2 from 3.3 V to 1.8 V

The memory card 100 switches the regulator VR2 so as to generate 1.8 V. Furthermore, the host device 200 switches the regulator VR1 so as to generate 1.8 V.

<Step S19, step S20> Timer Set

The host device 200 waits until a predetermined time elapses (FIG. 4: T5 to T6). Therefore, the timer sets 100 microseconds for example.

This is because the host device 200 needs to wait for the capacitors 206 and 118 connected to the regulator VR1 and regulator VR2 respectively to discharge from a state charged to 3.3 V to a state charged to 1.8 V.

It is of course possible to provide a circuit that causes the capacitors 206 and 118 to actively discharge, but since the discharge time is a sufficiently short time to human senses, the memory system 1 is not provided with any discharge circuit. The above described explanation assumes that the waiting time is 100 microseconds, but the waiting time varies depending on the specification of the capacitor 206 or 118 and is generally on the order of 10 to 500 microseconds.

<Step S21> Drive CLK to 1.8 V-DC

The host device 200 sets the clock signal line at the ground level to 1.8 V for a predetermined time after a lapse of 100 microseconds in the above described example (FIG. 4: T6). Here, the host device 200 applies a 1.8 V DC signal to the clock signal line which normally sends a clock signal. The host device 200 then informs the memory card 100 that the 1.8 V signal voltage can be supplied from the regulator VR2.

<Step S22> CLK 1.8 V?

When a voltage is applied to the clock signal line, the memory card 100 checks with the comparator 120, which is the first voltage comparison circuit, whether or not the signal voltage is 1.8 V. When no 1.8 V voltage is applied to the clock signal line (No), the memory card 100 does not perform further voltage switching processing and the memory card 100 stops operating in step S32.

<Step S23> Drive CMD/RES to 1.8 V-DC

In step S22, when the signal voltage of the clock signal line is confirmed to be 1.8 V (Yes), the memory card 100 drives the CMD/RES line (response signal line) at the ground level to 1.8 V (FIG. 4: T7). Here, the memory card 100 applies a 1.8 V DC signal to the response signal line which normally sends a RES signal.

<Step S24> Timer Set

After setting the signal voltage of the clock signal line to 1.8 V, the host device sets the timer.

<Step S25> CMD Line 1.8 V?

When a voltage is applied to the CMD/RES line, the host device 200 detects with the comparator (VDCMD/RES) 208 which is the second voltage comparison circuit whether or not the signal voltage of the CMD/RES signal line is 1.8 V.

<Step S26, Step S27>

When the 1.8 V voltage has not been applied to the clock signal line (No) even after a lapse of a predetermined time, for example, 100 microseconds, the host device 200 turns OFF the power switch (PSW) 201 in step S27 and stops the operation of the memory card 100.

As explained above, when the memory card 100 or the host device 200 does not perform the predetermined operation even after a lapse of the predetermined time in the middle of handshake processing in the voltage switching processing, the memory system 1 of the present embodiment may detect that switching to 1.8 V has not been successfully performed and thereby output an error code or execute initialization processing in a 3.3 V mode. An example thereof will be shown in FIG. 5.

Figure 5:
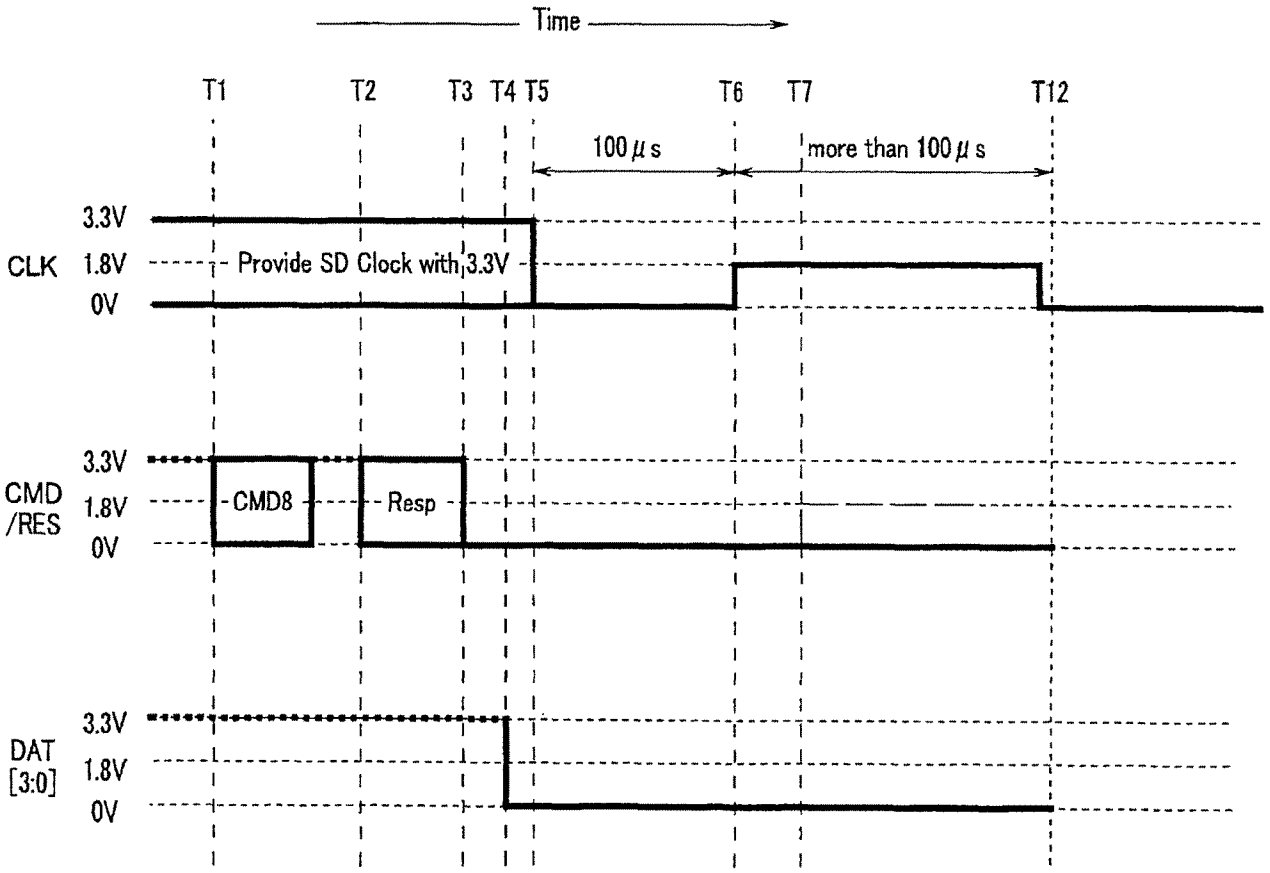
FIG. 5 is a bus timing chart during the signal voltage switching operation in the memory system according to the embodiment.

FIG. 5 shows a timing chart when the memory card 100 has not driven the CMD/RES line (response signal line) to 1.8 V in step S23. The host device 200 applies a 1.8 V voltage to the clock signal line and waits for a response operation from the memory card 100, that is, for the response signal line to change from 0 V (ground level) to 1.8 V. However, when the response signal line does not become 1.8 V even after a lapse of a predetermined time (for example, 100 microseconds), the host device 200 turns OFF the power switch 201 at T12 and stops the supply voltage (VDD) applied to the memory card 100. Furthermore, the host device 200 sets the voltage of the CLK signal line to 0 V.

Not only in the case shown in FIG. 5, but also in the event of an error in the middle of handshake processing during the voltage switching processing, the host device 200 sets the voltage of the CLK signal line to 0 V and stops the power supply to the memory card 100.

<Step S28> CLK Oscillation

In step S24, when the signal voltage of the CMD/RES signal line is confirmed to be 1.8 V (Yes), the host device 200 sends an oscillating clock signal to the clock signal line, in other words, oscillates the clock signal (FIG. 4: T8).

<Step S29, Step 30> Drive DAT to 1.8 V/DAT to Tri-State

After clock oscillation starts, the host device 200 drives the DAT signal line to a 1.8 V voltage for a short time (FIG. 4: T9 to T10), sets the DAT signal line to a tri-state. Since the DAT signal line is pulled up at 1.8 V, the voltage level of 1.8 V is maintained.

<Step S31, Step 32> CLK Oscillated?/CMD/RES to Tri-State

Upon receiving the oscillating clock signal from the host device 200 (Yes), the memory card 100 sets the CMD/RES line to a tri-state in step S29 (FIG. 4: T11). Since the CMD/RES line is pulled up at 1.8 V, the 1.8 V voltage level is maintained.

When the oscillating clock signal is not applied to the clock signal line (No), the memory card 100 stops operating in step S35.

<Step S33>

Both the memory card 100 and host device 200 perform initialization processing in the 3.3 V mode and transmits/receives subsequent signals at a 3.3 V signal voltage.

<Step S34>

Both the memory card 100 and host device 200 complete the processing of moving to the 1.8 V mode and transmits/receives subsequent signals at a 1.8 V signal voltage.

<Step S35>

When the procedure for moving the signal voltage to the 1.8 V mode fails and the memory card 100 stops, the host device 200 turns OFF once the power and then sends the 3.3 V signal voltage to the memory card 100 again and performs initialization processing in the 3.3 V mode without switching to the 1.8 V mode.

As explained above, in the memory system 1, the memory card 100 and host device 200 mutually check signal voltages used through handshake processing and thereby prevent the I/O cell or the like from being damaged. Furthermore, in the memory system 1, the memory card 100 and host device 200 mutually check the voltage of the output of the regulator 116 or 204, and can thereby improve the reliability of the voltage applied to the signal line. Furthermore, the memory system 1 defines the handshake processing sequence using the clock signal line and command signal line, and can thereby follow a procedure to safely perform switching from the first voltage (3.3 V) to the second voltage (1.8 V).

Even with the memory system 1, it remains possible to cause the I/O cell 121 or 209 damaged if switching to the 1.8 V mode is frequently performed. Therefore, the memory system 1 can preferably perform normal processing of switching the signal voltage to the 1.8 V mode only at the first stage before the initialization processing starts. That is, after switching to the 1.8 V mode, the memory system 1 does not change the voltage mode even if a reset command is issued.

In other words, even when a reset command is issued, the memory card 100 and host device 200 transmit and receive all signals at the second voltage of 1.8 V, and this state continues until the operation of the memory system 1 is completed where the supply voltage becomes 0 V.

Since the memory system 1 should not frequently switch the voltage mode, it is possible to maintain stability and reliability by preventing the signal voltage from being changed even by a reset.

Figure 6:
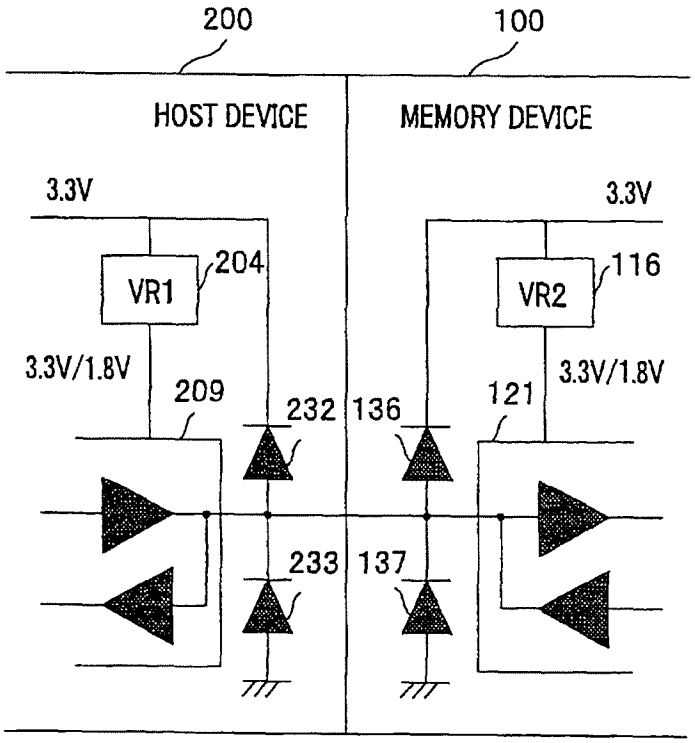
FIG. 6 is a partial configuration diagram showing a partial configuration of I/O cells of the memory card and host device according to the embodiment.

Next, a protection diode owned by the memory card 100 and host device 200 will be explained using FIG. 6. FIG. 6 is a partial configuration diagram showing partial configurations of the I/O cells 121 and 209 of the memory card 100 and host device 200.

Any one voltage of 3.3 V and 1.8 V which are the outputs of the regulators 204 and 116 is selected and applied to the I/O cells 209 and 121 of the host device 200 and memory card 100 respectively. Therefore, when the voltage is switched, there may be a time during which the output voltage of the regulator 204 differs from that of the regulator 116. When the output voltage of the regulator 204 is different from that of the regulator 116, a current may flow through an unexpected path and damage the I/O cell 121 or 209 or the like.

In the host device 200 and the memory card 100, protection diodes 232 and 136 are connected to the power lines of a 3.3 V voltage. Therefore, in the host device 200 and memory card 100, a protection diode 137 or 233 is not damaged by an applied voltage exceeding 1.8 V even in the 1.8 V mode.

That is, the memory card 100 has the non-volatile memory section 150 which is connectable to the host device 200, the power line VDD 114 that supplies the first voltage (3.3 V), the first regulator 116 that can output power of any one voltage selected from the first voltage (3.3 V) and the second voltage (1.8 V) which is lower than the first voltage from the VDD 114, the I/O cell 121 that receives the power supply from the first regulator 116 and transmits/receives signals to/from the host device 200, and the protection diode 136 connected to an input end of the I/O cell 121 and an end of the power supply connected to the 3.3 V power line to protect the I/O cell 121 from an overvoltage, wherein it is possible to perform transmission/reception to/from the host device 200 with a signal of any one voltage selected from the first voltage (3.3 V) and second voltage (1.8 V).

In the memory system 1, both the host device 200 and memory card 100 have the regulator 116 or 204 that can output two voltages, and therefore connecting the protection diode to the regulator output may damage the protection diode. When the signal voltage is set to 1.8 V, the supply voltage itself is generally set to 1.8 V, but since compatibility is taken into consideration in the memory system 1, the supply voltage is set to 3.3 V. Therefore, the above described protection diode 136 is effective in preventing damage to the protection diode in the memory system 1.

As explained above, the host device 200 and the memory card 100 switch the voltage mode only at the stage of connection start. Therefore, the host device 200 never switches voltages by sending a switch command FIG. 7A and FIG. 7B are diagrams illustrating parameter examples of a switch command for changing the transfer mode in which the host device 200 performs transmission.

The present embodiment has explained the memory system 1 or the like having an SD memory card (registered trademark) as the memory device for an example, but the present embodiment is also applicable to a memory system having another memory card, memory device, inner memory or the like as long as the memory system has a similar bus structure and can exert operations and effects similar to those of the memory system 1 or the like.

As described above, the memory device or the like of the present invention is as follows.

1. A memory device, host device, memory system, memory device control method, host device control method and memory system control method.
2. The memory device according to 1 above, wherein the memory device includes a memory controller and upon sending the response signal indicating that the signal voltage is switched from the first voltage to the second voltage, the memory controller holds a response signal line to 0 V.
3. The memory device according to 1 or 2 above, wherein the host device includes a host control section and upon receiving through the response signal that the signal voltage is switched from the first voltage to the second voltage, the host control section stops the clock signal and holds the clock signal line and the data signal line to 0 V.
4. The memory device according to any one of 1 to 3 above, wherein voltages detected by the first voltage comparison circuit and the second voltage comparison circuit are voltages of DC currents.
5. The memory device according to any one of 1 to 4 above, wherein the memory controller and the host control section wait for a predetermined time after starting to switch voltages outputted from the first regulator and the second regulator from the first voltage to the second voltage.
6. The memory device according to any one of 1 to 5 above, further including a third voltage comparison circuit and a fourth voltage comparison circuit that detect that the voltages outputted by the first regulator and the second regulator are the second voltages.
7. The memory device according to any one of 1 to 6 above, wherein the first I/O cell and the second I/O cell include protection diodes that protect the respective I/O cells from an overvoltage.
8. The memory device according to any one of 1 to 7 above, wherein after switching the signal voltage from the first voltage to the second voltage, the memory controller and the host control section transmit and receive the signal at the second voltage until the power is turned OFF.
9. The memory device according to any one of 1 to 8 above, wherein the memory section is a NAND type flash memory.

Furthermore, the memory device or the like of the present invention is a memory system having the memory device according to 2 to 8 above, a method of controlling the memory device and a method of controlling the memory system according to 2 to 8 above.

Furthermore, the memory device, host device, memory system, memory device control method, host device control method and memory system control method of the present embodiment will be described hereinafter.

1. A memory device connectable to a host device, the memory device including a non-volatile memory section, a first I/O cell that can transmit and receive a command signal, response signal, clock signal and data signal to/from the host device via a command signal line, response signal line, clock signal line or data signal line respectively at any one signal voltage selected from a first voltage and a second voltage which is lower than the first voltage, a first regulator that can output the first voltage and the second voltage, and a memory controller that sends, upon receiving the command signal requesting switching of the signal voltage from the first voltage to the second voltage from the host device, information indicating that the signal voltage will be switched to the host device using the response signal, switches a voltage outputted by the first regulator from the first voltage to the second voltage, applies, upon detecting that a clock signal line is at the second voltage, the second voltage to the response signal line at a ground level and starts, upon detecting oscillation of the clock signal, to transmit and receive a signal voltage of the second voltage.

2. The memory device according to 1 above, further including a first voltage comparison circuit that detects that a signal voltage of the clock signal line is the second voltage.

3. A host device to which a memory device having a non-volatile memory section is connectable, the host device including a second I/O cell that can transmit and receive a command signal, response signal, clock signal and data signal to/from the memory device via a command signal line, response signal line, clock signal line or data signal line respectively at any one signal voltage selected from a first voltage and a second voltage which is lower than the first voltage, a second regulator that can output the first voltage and the second voltage, and a host control section that sends, when the signal voltage is switched from the first voltage to the second voltage, information indicating that the signal voltage will be switched using the command signal, switches, upon receiving the response signal indicating that the signal voltage can be switched, a voltage outputted by the second regulator from the first voltage to the second voltage, applies the second voltage to the clock signal line at a ground level, oscillates, upon detecting that the response signal line is at the second voltage, the clock signal and starts transmission/reception at a signal voltage of the second voltage.

4. A host device to which a memory device having a non-volatile memory section is connectable, the host device including a second I/O cell that can transmit and receive a command signal, response signal, clock signal and data signal to/from the memory device via a command signal line, response signal line, clock signal line or data signal line respectively at any one signal voltage selected from a first voltage and a second voltage which is lower than the first voltage, a second regulator that can output the first voltage and the second voltage, and a host control section that sends, when the signal voltage is switched from the first voltage to the second voltage, information indicating that the signal voltage will be switched using the command signal, turns OFF once the power of the memory device when the response signal indicating that the signal voltage can be switched cannot be received for a predetermined time or upon receiving a response signal indicating that switching is not possible and starts transmission/reception at the first voltage again.

5. The host device according to 3 or 4 above, further including a second voltage comparison circuit that detects that a signal voltage of the response signal line is the second voltage.

6. A memory system including a memory device including a first I/O cell that can transmit and receive a command signal, response signal, clock signal and data signal to/from the host device via a command signal line, response signal line, clock signal line or data signal line respectively at any one signal voltage selected from a first voltage and a second voltage which is lower than the first voltage, a first regulator that can output the first voltage and the second voltage, and a memory controller that receives the command signal that requests switching of the signal voltage from the host device including a second I/O cell that can perform transmission/reception to/from the memory device when the signal voltage is switched from the first voltage to the second voltage at any one signal voltage selected from the first voltage and the second voltage and a second regulator that can output the first voltage and the second voltage, sends information indicating that the signal voltage can be switched to the host device using the response signal at the first voltage, switches a voltage outputted by the first regulator from the first voltage to the second voltage, applies, upon detecting that the clock signal line is at the second voltage, the second voltage to the response signal line at a ground level and starts transmission/reception upon detecting that the response signal line is at the second voltage and detecting oscillation of a clock signal from the host device at a signal voltage of the second voltage, and a host device including a second I/O cell that can perform transmission/reception to/from the memory device at any one signal voltage selected from the first voltage and the second voltage, a second regulator that can output the first voltage and the second voltage, and a host control section that sends, when the signal voltage is switched from the first voltage to the second voltage, the command signal requesting switching of the signal voltage to the memory device, receives information indicating that the signal voltage can be switched from the memory device using the response signal at the first voltage, switches a voltage outputted by the second regulator from the first voltage to the second voltage, applies the second voltage to a clock signal line at a ground level and oscillates the clock signal upon detecting that the response signal line is at the second voltage.

7. The memory system according to 6 above, wherein the memory device further includes a first voltage comparison circuit that detects that a signal voltage of the clock signal line is the second voltage and the host device further includes a second voltage comparison circuit that detects that a signal voltage of the response signal line is the second voltage.

8. A method of controlling a memory device connectable to a host device, the memory device including a non-volatile memory section, a first I/O cell that can transmit and receive a command signal, response signal, clock signal and data signal to/from the host device via a command signal line, response signal line, clock signal line or data signal line at any one signal voltage selected from a first voltage and a second voltage which is lower than the first voltage, a first regulator that can output the first voltage and the second voltage and a memory controller, the method including a command receiving step of receiving the command signal requesting switching of the signal voltage from the first voltage to the second voltage from the host device, a response signal sending step of sending information indicating that the signal voltage can be switched to the host device using the response signal, a first regulator switching step of switching a voltage outputted by the first regulator from the first voltage to the second voltage, a clock signal line voltage detecting step of detecting that the clock signal line is at the second voltage, a response signal line voltage applying step of applying the second voltage to the response signal line at a ground level, a clock signal oscillation detecting step of detecting oscillation of the clock signal and a transmitting/receiving step of starting transmission/reception at a signal voltage of the second voltage.

9. The method of controlling a memory device according to 8 above, the memory device further including a first voltage comparison circuit that detects that a signal voltage of the clock signal line is the second voltage.

10. A method of controlling a host device to which a memory device having a non-Volatile memory section is connectable, the host device including a second I/O cell that can transmit and receive a command signal, response signal, clock signal and data signal to/from the memory device via a command signal line, response signal line, clock signal line or data signal line respectively at any one signal voltage selected from a first voltage and a second voltage which is lower than the first voltage and a second regulator that can output the first voltage and the second voltage and a host control section, the method including a command signal sending step of sending, when the signal voltage is switched from the first voltage to the second voltage, information indicating that the signal voltage will be switched using the command signal, a response signal receiving step of receiving the response signal indicating that the signal voltage can be switched, a regulator voltage switching step of switching a voltage outputted by the second regulator from the first voltage to the second voltage, a clock signal line voltage applying step of applying the second voltage to the clock signal line at a ground level, a response signal line voltage detecting step of detecting that the response signal line is at the second voltage, a clock signal oscillation step of oscillating the clock signal and a transmitting/receiving step of starting transmission/reception at a signal voltage of the second voltage.

11. The method of controlling a host device according to 10 above, the host device further including a second voltage comparison circuit that detects that a signal voltage of the response signal line is the second voltage.

12. A method of controlling a memory system including a host device and a memory device connectable to the host device, when the memory device including a non-volatile memory section, a first I/O cell that can transmit and receive a command signal, response signal, clock signal and data signal to/from the host device via a command signal line, response signal line, clock signal line or data signal line respectively at any one signal voltage selected from the first voltage and a second voltage which is lower than the first voltage, a first regulator that can output the first voltage and the second voltage and a memory controller, and the host device including a second I/O cell that can transmit and receive the signal to/from the memory device at the signal voltage selected from the first voltage and the second voltage, a second regulator that can output the first voltage and the second voltage and a host control section switch the signal voltage from the first voltage to the second voltage, the method including a command signal sending step of sending the command signal requesting switching of the signal voltage to the memory device, a response signal sending step of the memory device sending information indicating that the signal voltage can be switched to the host device using the response signal at the first voltage, a regulator voltage switching step of the memory device and the host device switching a voltage outputted by the first regulator and the second regulator from the first voltage to the second voltage, a clock signal line voltage applying step of the host device applying the second voltage to the clock signal line at a ground level, a clock signal line voltage detecting step of the memory device detecting that the clock signal line is at the second voltage, a response signal line voltage applying step of the memory device applying the second voltage to the response signal line at a ground level, a response signal line voltage detecting step of the host device detecting that the response signal line is at the second voltage, a clock signal oscillation step of the host device oscillating the clock signal, a clock signal oscillation detecting step of the memory device detecting oscillation of the clock signal, and a transmitting/receiving step of the memory device and the host device starting transmission/reception at a signal voltage of the second voltage.

13. The method of controlling a memory system according to 12 above, wherein the memory device includes a first voltage comparison circuit that detects that a signal voltage of the clock signal line is the second voltage and the host device includes a second voltage comparison circuit that detects that a signal voltage of the response signal line is the second voltage.

14. A memory device connectable to a host device, including a non-volatile memory section, a memory controller, a power supply that supplies a first voltage, a regulator that can output power of any one voltage selected from the first voltage and a second voltage which is lower than the first voltage from the power supply, an I/O cell that receives a power supply from the regulator, can perform transmission/reception to/from the host device via a command signal line, response signal line, clock signal line or data signal line respectively using a signal of any one voltage selected from the first voltage and the second voltage and a protection diode connected between an input end of the I/O cell and an end of the power supply to protect the I/O cell from an overvoltage.

15. A host device connectable to a memory device having a non-volatile memory section, including a host control section, a power supply that supplies a first voltage, a regulator that can output power of any one voltage selected from the first voltage from the power supply and a second voltage which is lower than the first voltage, an I/O cell that receives a power supply from the regulator, can perform transmission/reception to/from the memory device via a command signal line, response signal line, clock signal line or data signal line using a signal at any one voltage selected from the first voltage and the second voltage and a protection diode connected between an input end of the I/O cell and an end of the power supply to protect the I/O cell from an overvoltage.

Second Embodiment

Hereinafter, a memory system 301 having a memory card 400 which is a memory device, a host device 500, a memory card 400 and a host device 500 according to a second embodiment of the present invention will be explained with reference to the accompanying drawings. Since the memory system 301 or the like of the present embodiment is similar to the memory system 1 or the like according to the first embodiment, the same components will be assigned the same reference numerals and explanations thereof will be omitted.

Figure 8A:
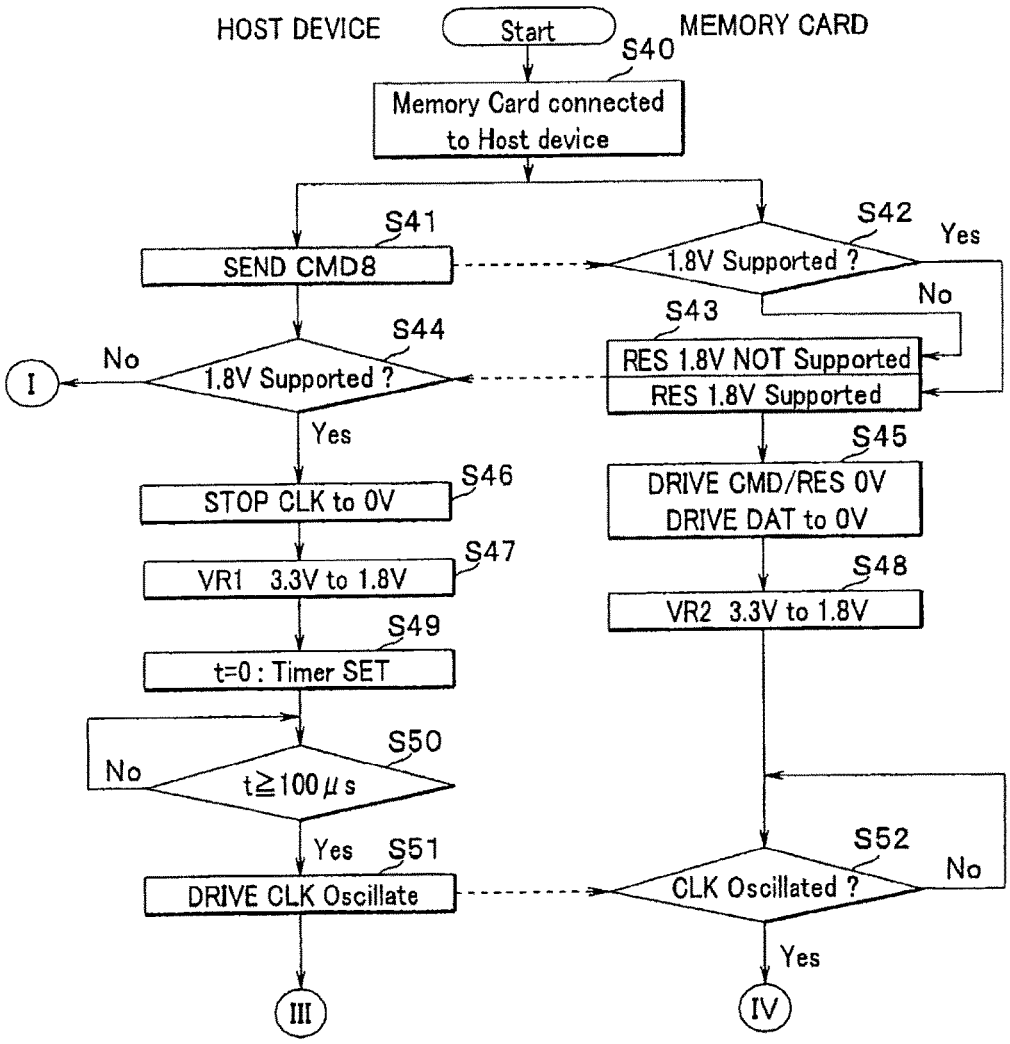
FIG. 8A is a flowchart illustrating a signal voltage switching operation in a memory system according to a second embodiment.
Figure 8B:
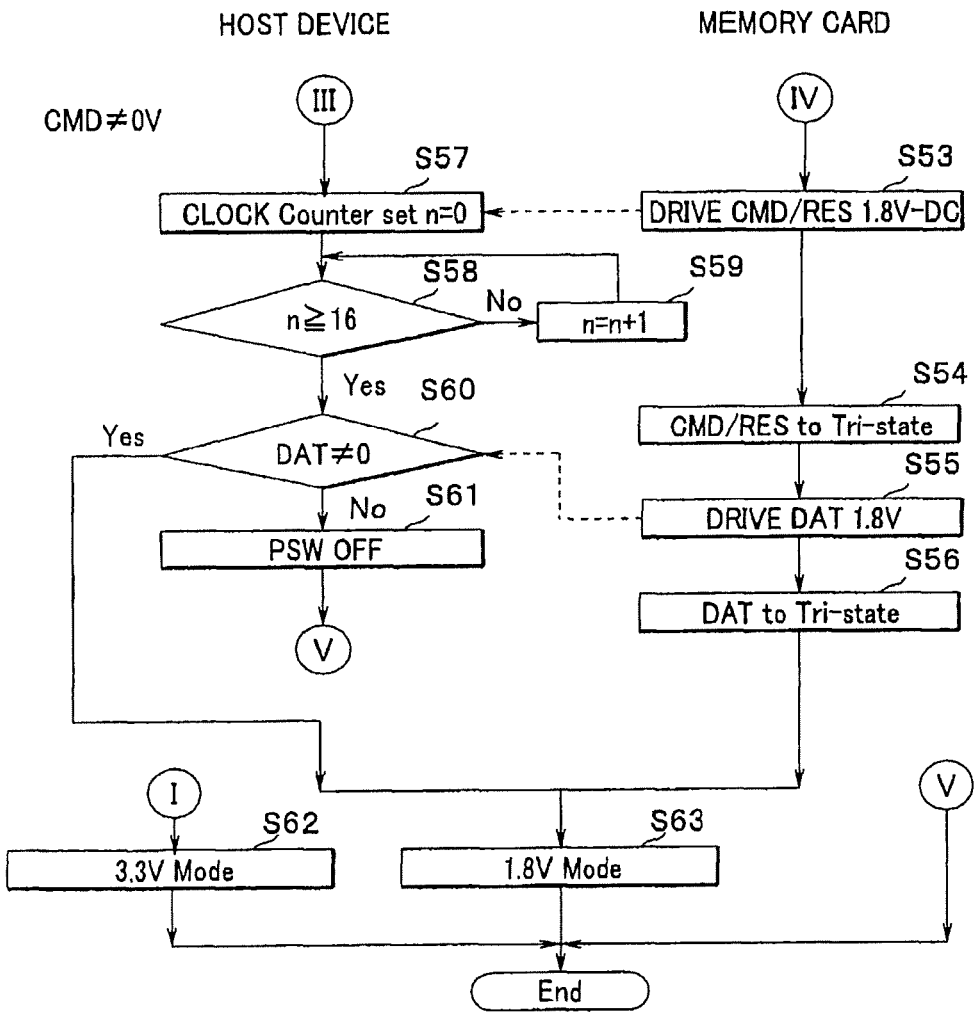
FIG. 8B is a flowchart illustrating the signal voltage switching operation in the memory system according to the second embodiment.
Figure 9:
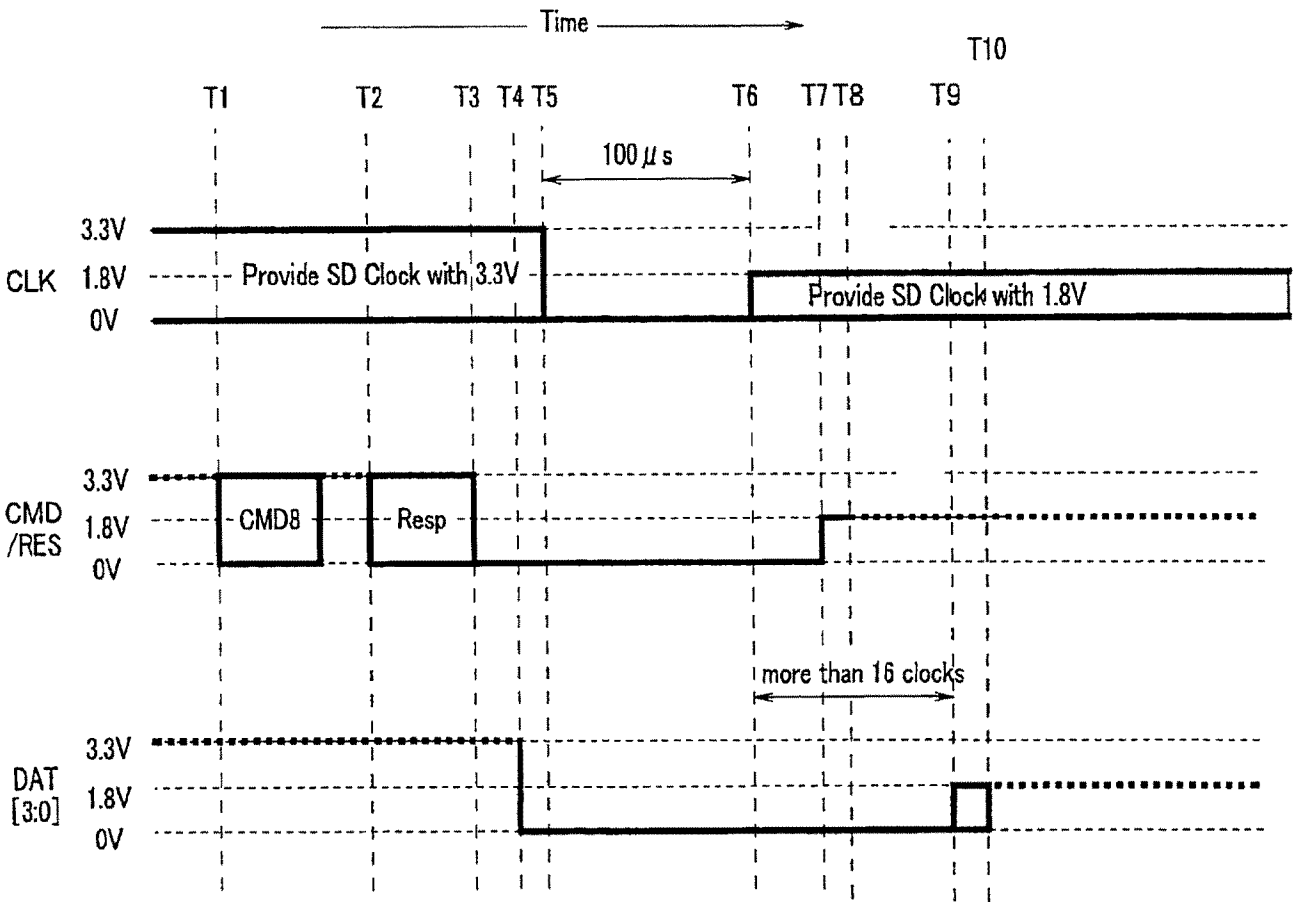
FIG. 9 is a bus timing chart during a signal voltage switching operation in the memory system according to the second embodiment.
Figure 10:
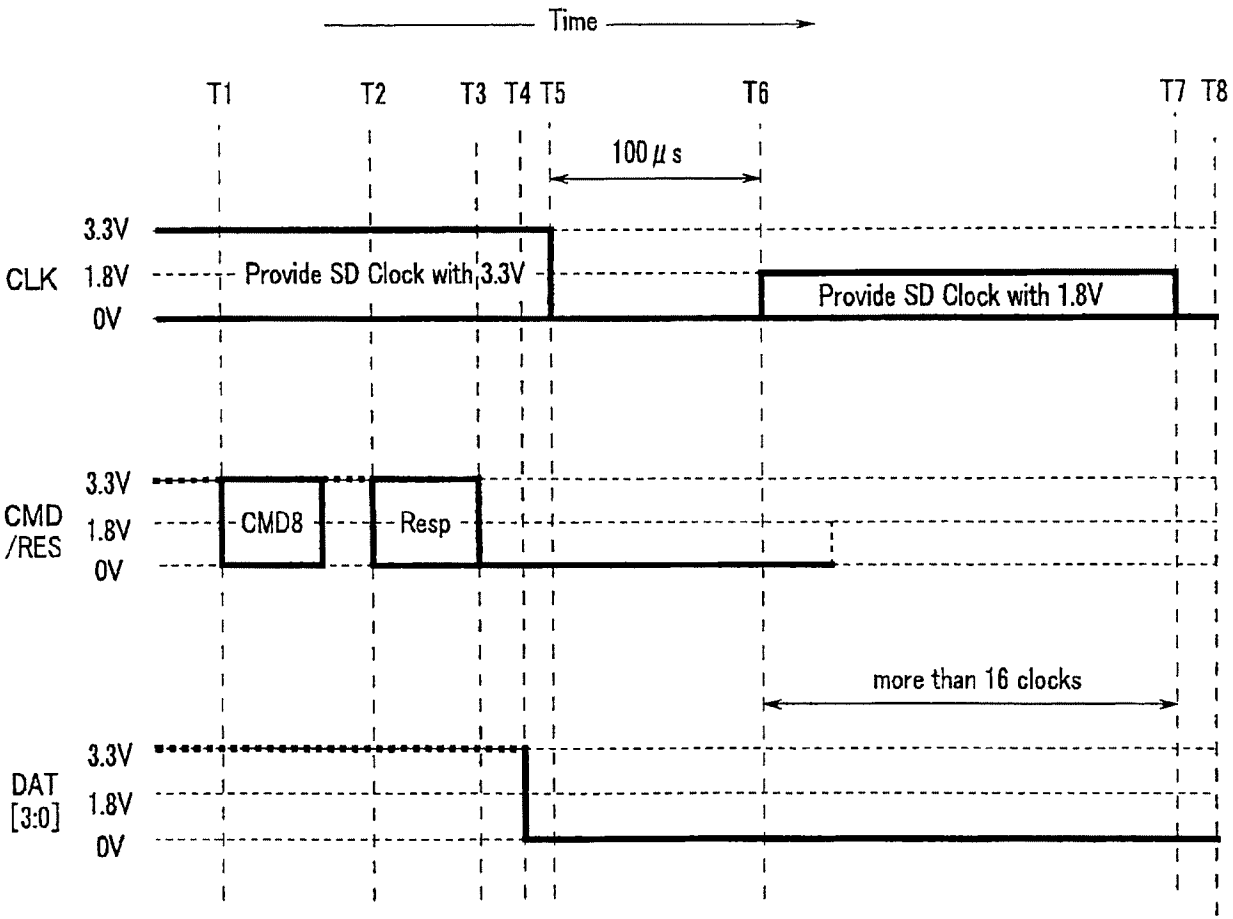
FIG. 10 is another bus timing chart during the signal voltage switching operation in the memory system according to the second embodiment.

Next, a signal voltage switching operation of the memory system 301 will be explained using FIG. 8A, FIG. 8B, FIG. 9 and FIG. 10, FIG. 8A and FIG. 8B are flowcharts illustrating the signal voltage switching operation of the memory system 301 and FIG. 9 and FIG. 10 are timing charts of a signal line group (bus) during the signal voltage switching operation of the memory system 301.

Hereinafter, the signal voltage switching operation of the memory system 301 will be explained according to the flowcharts of FIG. 8A and FIG. 8B. The left side of FIG. 8A and FIG. 8B shows an operation flow of the host device 500 and the right side shows an operation flow of the memory card 400.

<Step S40> to <Step S44>

Since these steps are the same as step S10 to step S14 of the memory system 1 or the like, explanations thereof will be omitted.

<Step S45> Drive CMD/RES to 0 V, Drive DAT to 0 V

After sending a response signal, the memory card 400 sets the CMD line to L level (ground level: 0 V) (FIG. 9: T3) and sets the DAT line to L level (ground level=0 V) (FIG. 9: T4). Between the CMD/RES line and DAT line, any line can be set to L level first.

<Step S46> Stop CLK to 0 V

The host device 500 stops clock oscillation and also sets the CLK line to L level (ground level: 0 V) (FIG. 9: T5).

<Step S47> to <Step S50>

Since these steps are the same as step S17 to step S20 of the memory system 1 or the like, explanations thereof will be omitted.

<Step S51> CLK Oscillation

After a lapse of a predetermined period (e.g., 100 microseconds) in the steps 49, 50, the host device 500 sends an oscillating clock signal to a clock signal line, in other words, oscillates a clock signal (FIG, 9: T6). The host device 500 then informs the memory card 400 that a 1.8 V signal voltage can be supplied from a regulator VR2.

<Step S52> CLK Oscillation?

The memory card 400 checks whether or not an H level clock signal of a predetermined voltage is applied to the clock signal line.

<Step S53>

This step is the same as step S23 of the memory system 1 or the like and therefore explanations thereof will be omitted.

<Step S54> CMD/RES to Tri-State

The memory card 400 drives the CMD/RES line to a 1.8 V voltage for only a short time (FIG. 9: T7 to T8), and then sets the CMD/RES line to a tri-state (FIG. 9: T8). Since the CMD/RES line is pulled up at 1.8 V, the voltage level of 1.8 V is maintained.

<Step S55, Step 56> Drive DAT to 1.8 V/DAT to Tri-State

The memory card 400 drives the DAT signal line to a 1.8 V mode voltage for only a short time (FIG. 9: T9 to T10), then sets the DAT signal line to a tri-state. Since the DAT signal line is pulled up at 1.8 V, the voltage level of 1.8 V is maintained.

<Step S57> Clock Counter Set

The host device 500 sets the clock counter after oscillating the clock signal and then sets a count n to 0.

<Step S58, Step S59>

The host device 500 waits until at least 16 clocks are counted. A value equal to or greater than 16 clocks is set as the waiting time.

<Step S60> DAT Line 1.8 V?

The host device 500 detects that the DAT signal line is not at a ground level, that is, that a predetermined voltage is applied. Here, the predetermined voltage is 1.8 V.

When no voltage is applied to the DAT signal line (No), the host device 500 turns OFF a power switch (PSW) 201 in step S61 and stops operation of the memory card 400. When a voltage is applied to the DAT signal line (Yes), in step S63, the host device 500 transmits/receives subsequent signals at a 1.8 V signal voltage.

Furthermore, the host device 500 detects that not only the DAT signal line but also the DAT signal line and CMD signal line are not at a ground level, that is, by detecting that a predetermined voltage is applied, it is possible to perform voltage switching processing more safely. Here, the predetermined voltage is 1.8 V.

<Step S62>

Both the memory card 400 and the host device 500 perform initialization processing in a 3.3 V mode and transmits/receives subsequent signals at a 3.3 V signal voltage.

<Step S63>

Both the memory card 400 and the host device 500 complete the processing of moving to the 1.8 V mode and transmits/receives subsequent signals at a 1.8 V signal voltage.

When the procedure for moving to the 1.8 V mode signal voltage fails and the memory card 400 stops, the host device 500 turns OFF once the power, sends a 3.3 V signal voltage to the memory card 400 again and performs initialization processing in the 3.3 V mode without switching to the 1.8 V mode.

As described above, the memory card 400 of the memory system 301 detects the voltage of the oscillation clock signal outputted by the host device 500. This eliminates the necessity for a circuit that applies a DC voltage to the clock signal line, which is required in the memory system 1. Furthermore, the memory card 400 sets the DAT line to a tri-state.

Despite its simpler configuration, the memory system 301 of the present embodiment can still exert effects similar to those of the memory system 1 of the first embodiment.

Third Embodiment

Hereinafter, a memory card 700, which is a memory device, a host device 800 and a memory system 601 having the memory card 700 and the host device 800 according to a third embodiment of the present invention will be explained. The memory system 601 or the like of the present embodiment is similar to the memory system 301 or the like of the second embodiment, and therefore the same components will be assigned the same reference numerals and explanations thereof will be omitted.

The memory system 601 or the like is not provided with the comparators 119, 120, 207, 208 (see FIG. 2) for confirming that the voltage is a desired voltage, for example, 1.8 V.

Therefore, the memory card 700 checks in step S52 in FIG. 8A that the clock signal line is not at a ground level, that is, only the presence/absence of clock oscillation. Furthermore, in step S55 in FIG. 8B, the host device 800 only checks whether or not any voltage is applied to the CMD line, that is, whether or not the CMD line is at a ground level.

Despite its simpler configuration, the memory system 601 of the present embodiment can still exert effects similar to those of the memory system 1 or the like of the first embodiment.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

The present application is based on Japanese Patent Application No. 2008-72429 filed on Mar. 19, 2008 and Japanese Patent Application No. 2008-99740 filed on Apr. 7, 2008 as the basis for claiming priority, entire disclosure content of which is quoted in the specification of the present application, claims and drawings.

The invention claimed is:

1. A connectable device connectable to a host device comprising:

a connectable interface that can receive a command signal via a command/response signal line, receive a clock signal via a clock signal line, transmit a response signal via the command/response signal line, and transmit and receive a data signal via data signal lines at any one signal voltage selected from a first voltage and a second voltage which is lower than the first voltage;

a regulator that can output the first voltage and the second voltage; and a connectable device controller, the connectable device controller being configured to:

receive the command signal requesting switching of the signal voltage from the first voltage to the second voltage from the host device;

send [a] *the* response signal for notifying that the switching is possible to the host device, and thereafter set the command/response signal line and the data signal lines at a ground level;

start, after the clock signal line is set at a ground level by the host device, processing for switching a voltage outputted by the regulator from the first voltage to the second voltage, apply, when detecting that a voltage other than the ground level is applied to the clock signal line by the host device, the second voltage to the command/response signal line and the data signal lines, which had been set at the ground level, to indicate completion of the switching processing to the host device, and start transmission/reception of signals at the second voltage after completion of the switching processing.

2. The connectable device according to claim 1, further comprising a voltage comparison circuit that detects whether or not the signal voltage of the clock signal line is the second voltage, wherein, when the voltage comparison circuit detects that the signal voltage of the clock signal line is the second voltage, the connectable device controller applies the second voltage to the command/response signal line and the data signal lines, which had been set at the ground level, and when the voltage comparison circuit detects that the signal voltage is not the second voltage, the connectable device controller continues the ground level for at least the data signal lines.

3. The connectable device according to claim 1, further comprising a voltage comparison circuit that detects whether or not the voltage outputted by the regulator is the second voltage, wherein, when the [other] voltage comparison circuit detects that the voltage outputted by the regulator is the second voltage, the connectable device controller applies the second voltage to the command/response signal line and the data signal lines, which had been set at the ground level, and when the voltage comparison circuit detects that the voltage outputted by the regulator is not the second voltage, the connectable device controller continues the ground level for at least the data signal lines.

4. The connectable device according to claim 1, comprising a non-volatile memory section.

5. The connectable device according to claim 1, further comprising a protection diode between an input end of the interface and a power line that supplies the first voltage.

6. A host device to which a connectable device is connectable, comprising:

an interface that can transmit a command signal via a command/response signal line, transmit a clock signal via a clock signal line, receive a response signal via the command/response signal line, and transmit and receive a data signal via data signal lines at any one signal voltage selected from a first voltage and a second voltage which is lower than the first voltage;

a regulator that can output the first voltage and the second voltage; and a host control section, the host control section configured to:

send a command signal requesting a switching processing for switching the signal voltage to the second voltage to the connectable device, when switching the signal voltage from the first voltage to the second voltage;

receive [a] *the* response signal from the connectable device, and thereafter set, when the command/response signal line is at the ground level, the clock signal line at a ground level, and then start processing for switching a voltage outputted by the regulator from the first voltage to the second voltage to switch the voltage to the second voltage within a predetermined time;

supply the clock signal of the second voltage to the clock signal line after a predetermined time has elapsed since the setting of the clock signal line at the ground level in the switching processing; and start transmission/reception of signals at the second voltage, when detecting that the data signal lines are not at the ground level.

7. The host device according to claim 6, wherein if an error occurs in the middle of the processing for switching the voltage, when the command/response signal line is at a level other than the ground level after receiving the response signal or when one of the data signal lines is at the ground level after a predetermined time has elapsed since supplying the clock signal of the second voltage, the host control section executes initialization processing in a first voltage mode.

8. The host device according to claim 6, further comprising:

a voltage comparison circuit that detects whether or not a signal voltage of the command/response signal line is the second voltage, wherein, after the host control section supplies the clock signal of the second voltage to the clock signal line, when the voltage comparison circuit detects that the signal voltage of the command/response signal line is the second voltage, the host control section starts transmission/reception of signals at the second voltage, and when the voltage comparison circuit detects that the signal voltage of the command/response signal line is not the second voltage, the host control section executes initialization processing in a first voltage mode.

9. The host device according to claim 6, wherein the connectable device comprises a non-volatile memory section.

10. The host device according to claim 6, further comprising a protection diode between an input end of the interface and a power line that supplies the first voltage.

11. A system comprising:

a host device; and a connectable device which is connectable to the host device, the connectable device comprising:

an interface that can receive a command signal via a command/response signal line, receive a clock signal via a clock signal line, transmit a response signal via the command/response signal line, and transmit and receive a data signal via data signal lines at any one signal voltage selected from a first voltage and a second voltage which is lower than the first voltage; and a first regulator that can output the first voltage and the second voltage, the host device comprising:

an interface that can transmit the command signal via the command/response signal line, transmit the clock signal via the clock signal line, receive the response signal via the command/response signal line, and transmit and receive the data signal via the data signal lines at any one signal voltage selected from the first voltage and the second voltage; and a second regulator that can output the first voltage and the second voltage, wherein, when switching of the signal voltage from the first voltage to the second voltage is performed, the host device transmits the command signal requesting switching of the signal voltage to the connectable device, and the connectable device sends [a] *the* response signal for notifying that the switching is possible to the host device, and thereafter set the command/response signal line and data signal lines at a ground level, and wherein, when the connectable device can switch the signal voltage, after the clock signal is set at a ground level by the host device, the connectable device and the host device start processing for switching voltages outputted by the first regulator and the second regulator from the first voltage to the second voltage, the host device supplies, after a predetermined time has elapsed since the setting of the clock signal line at the ground level, the clock signal of the second voltage to the clock signal line, the connectable device applies, when detecting that a voltage other than the ground level is applied to the clock signal line, the second voltage to the command/response signal line and the data signal lines, which had been set at the ground level, and the host device starts transmission/reception of signals at the second voltage, after detecting that the data signal lines are not at the ground level.

12. The system according to claim 11, wherein the connectable device further comprises a first voltage comparison circuit that detects whether or not the signal voltage of the clock signal line is the second voltage and a second voltage comparison circuit that detects whether or not the voltage outputted by the first regulator is the second voltage, and the connectable device applies, when all the voltage comparison circuits detect that each of the voltages is the second voltage, the second voltage to the command/response signal line and the data signal lines, which had been set at the ground level, and continues, when any one of the voltage comparison circuits detects that the voltage is not the second voltage, the ground level for at least the data signal lines, and the host device starts transmission/reception of signals at the second voltage when detecting that the data signal lines are not at the ground level.

13. The system according to claim 11, wherein the connectable device comprises a non-volatile memory section.

14. The system according to claim 11, further comprising protection diodes, a first one of which is provided between a host input end of the interface and a power line that supplies the first voltage and a second one of which is provided between a device input end of the interface and a power line of the device that supplies the first voltage.

*15. A connectable device connectable to a host device comprising:*

*a connectable interface being able to receive a command signal via a command/response signal line, receive a clock signal via a clock signal line, transmit a response signal via the command/response signal line, and transmit and receive a data signal via data signal lines at any one signal voltage selected from a first voltage and a second voltage which is lower than the first voltage;*

*a regulator being able to output the first voltage and the second voltage; and*

*a connectable device controller, the connectable device controller being configured to:*

*receive the command signal requesting switching of the signal voltage from the first voltage to the second voltage from the host device;*

*send a response signal for notifying that the switching is possible to the host device, and thereafter set the command/response signal line and the data signal lines at a ground level;*

*start processing for switching a voltage outputted by the regulator from the first voltage to the second voltage,*

*apply the second voltage to the command/response signal line and the data signal lines, which had been set at the ground level, to indicate completion of the switching processing to the host device, and*

*start transmission/reception of signals at the second voltage after completion of the switching processing.*

*16. The connectable device according to claim 15, wherein:*

*the connectable device is configured to:*

*start the processing for switching a voltage outputted by the regulator from the first voltage to the second voltage after the clock signal line is set at the ground level by the host device,*

*apply the second voltage to the command/response signal line and the data signal lines, which had been set at the ground level when detecting that a voltage other than the ground level is applied to the clock signal line by the host device, and*

*start the transmission/reception of signals at the second voltage after completion of the switching processing.*

*17. The connectable device according to claim 15, further comprising a voltage comparison circuit that detects whether or not the signal voltage of the clock signal line is the second voltage,*

*wherein, when the voltage comparison circuit detects that the signal voltage of the clock signal line is the second voltage, the connectable device controller applies the second voltage to the command/response signal line and the data signal lines, which had been set at the ground level, and when the voltage comparison circuit detects that the signal voltage is not the second voltage, the connectable device controller continues the ground level for at least the data signal lines.*

*18. The connectable device according to claim 15, further comprising a voltage comparison circuit that detects whether or not the voltage outputted by the regulator is the second voltage,*

*wherein, when the voltage comparison circuit detects that the voltage outputted by the regulator is the second voltage, the connectable device controller applies the second voltage to the command/response signal line and the data signal lines, which had been set at the ground level, and when the voltage comparison circuit detects that the voltage outputted by the regulator is not*

*the second voltage, the connectable device controller continues the ground level for at least the data signal lines.*

*19. The connectable device according to claim 15, comprising a non-volatile memory section.*

*20. The connectable device according to claim 15, further comprising a protection diode between an input end of the interface and a power line that supplies the first voltage.*

*21. A host device to which a connectable device is connectable, comprising:*

*an interface being able to transmit a command signal via a command/response signal line, transmit a clock signal via a clock signal line, receive a response signal via the command/response signal line, and transmit and receive a data signal via data signal lines at any one signal voltage selected from a first voltage and a second voltage which is lower than the first voltage;*

*a regulator being able to output the first voltage and the second voltage; and*

*a host control section, the host control section configured to:*

*send a command signal requesting a switching processing for switching the signal voltage to the second voltage to the connectable device,*

*receive the response signal from the connectable device, and thereafter set the clock signal line at a ground level, and then start processing for switching a voltage outputted by the regulator from the first voltage to the second voltage to switch the voltage to the second voltage within a predetermined time;*

*supply the clock signal of the second voltage to the clock signal line; and*

*start transmission/reception of signals at the second voltage.*

*22. The host device according to claim 21, wherein*

*the host device is configured to:*

*send the command signal requesting switching processing for switching the signal voltage to the second voltage to the connectable device when switching the signal voltage from the first voltage to the second voltage;*

*set the clock signal line at the ground level when the command/response signal line is at the ground level;*

*supply the clock signal of the second voltage to the clock signal line after a predetermined time has elapsed since the setting of the clock signal line at the ground level in the switching processing, and*

*start the transmission/reception of signals at the second voltage when detecting that the data signal lines are not at the ground level.*

*23. The host device according to claim 21, wherein if an error occurs in the middle of the processing for switching the voltage, when the command/response signal line is at a level other than the ground level after receiving the response signal or when one of the data signal lines is at the ground level after a predetermined time has elapsed since supplying the clock signal of the second voltage, the host control section executes initialization processing in a first voltage mode.*

*24. The host device according to claim 21, further comprising:*

*a voltage comparison circuit that detects whether or not a signal voltage of the command/response signal line is the second voltage,*

*wherein, after the host control section supplies the clock signal of the second voltage to the clock signal line, when the voltage comparison circuit detects that the signal voltage of the command/response signal line is the second voltage, the host control section starts transmission/reception of signals at the second voltage, and when the voltage comparison circuit detects that the signal voltage of the command/response signal line is not the second voltage, the host control section executes initialization processing in a first voltage mode.*

*25. The host device according to claim 21, wherein the connectable device comprises a non-volatile memory section.*

*26. The host device according to claim 21, further comprising a protection diode between an input end of the interface and a power line that supplies the first voltage.*

*27. A system comprising:*

*a host device; and*

*a connectable device which is connectable to the host device, the connectable device comprising:*

*an interface being able to receive a command signal via a command/response signal line, receive a clock signal via a clock signal line, transmit a response signal via the command/response signal line, and transmit and receive a data signal via data signal lines at any one signal voltage selected from a first voltage and a second voltage which is lower than the first voltage; and*

*a first regulator being able to output the first voltage and the second voltage,*

*the host device comprising:*

*an interface being able to transmit the command signal via the command/response signal line, transmit the clock signal via the clock signal line, receive the response signal via the command/response signal line, and transmit and receive the data signal via the data signal lines at any one signal voltage selected from the first voltage and the second voltage; and*

*a second regulator being able to output the first voltage and the second voltage,*

*wherein, when switching of the signal voltage from the first voltage to the second voltage is performed,*

*the host device transmits the command signal requesting switching of the signal voltage to the connectable device, and the connectable device sends the response signal for notifying that the switching is possible to the host device, and thereafter set the command/response signal line and data signal lines at a ground level, and wherein, the connectable device and the host device start processing for switching voltages outputted by the first regulator and the second regulator from the first voltage to the second voltage,*

*the host device supplies the clock signal of the second voltage to the clock signal line,*

*the connectable device applies the second voltage to the command/response signal line and the data signal lines, which had been set at the ground level, and*

*the host device starts transmission/reception of signals at the second voltage.*

*28. The system according to claim 27, wherein:*

*the connectable device and the host device execute the processing for switching voltages outputted by the first regulator and the second regulator from the first voltage to the second voltage after the clock signal is set at a ground level by the host device when the connectable device is able to switch the signal voltage,*

*the host device supplies the clock signal of the second voltage to the clock signal line after a predetermined time has elapsed since the setting of the clock signal line at the ground level,*

*the connectable device applies the second voltage to the command/response signal line and the data signal lines, which had been set at the ground level, when detecting that a voltage other than the ground level is applied to the clock signal line,*

*the host device starts the transmission/reception of signals at the second voltage after detecting that the data signal lines are not at the ground level.*

*29. The system according to claim 27, wherein the connectable device further comprises a first voltage comparison circuit that detects whether or not the signal voltage of the clock signal line is the second voltage and a second voltage comparison circuit that detects whether or not the voltage outputted by the first regulator is the second voltage, and*

*the connectable device applies, when all the voltage comparison circuits detect that each of the voltages is the second voltage, the second voltage to the command/response signal line and the data signal lines, which had been set at the ground level, and continues, when any one of the voltage comparison circuits detects that the voltage is not the second voltage, the ground level for at least the data signal lines, and*

*the host device starts transmission/reception of signals at the second voltage when detecting that the data signal lines are not at the ground level.*

*30. The system according to claim 27, wherein the connectable device comprises a non-volatile memory section.*

*31. The system according to claim 27, further comprising protection diodes, a first one of which is provided between a host input end of the interface and a power line that supplies the first voltage and a second one of which is provided between a device input end of the interface and a power line of the device that supplies the first voltage.*

* * * * *